(12) United States Patent
Leverger (10) Patent No.: US 11,692,577 B2
(45) Date of Patent: Jul. 4, 2023

(54) FASTENER AND A PART HAVING THE SAME

(71) Applicant: ILLINOIS TOOL WORKS INC., Glenview, IL (US)

(72) Inventor: Eric Leverger, Epone (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 282 days.

(21) Appl. No.: 17/004,304

(22) Filed: Aug. 27, 2020

(65) Prior Publication Data
US 2021/0123468 A1 Apr. 29, 2021

(30) Foreign Application Priority Data

Oct. 24, 2019 (EP) .................................... 19205204
Aug. 4, 2020 (EP) .................................... 20189443

(51) Int. Cl.
*F16B 21/06* (2006.01)
*F16B 5/06* (2006.01)
*F16B 21/02* (2006.01)
*B60R 13/02* (2006.01)

(52) U.S. Cl.
CPC ............ *F16B 21/06* (2013.01); *F16B 5/0621* (2013.01); *F16B 21/02* (2013.01); *B60R 13/0206* (2013.01)

(58) Field of Classification Search
CPC ........ F16B 21/02; F16B 21/06; F16B 21/086; F16B 5/0621; F16B 5/0642; F16B 5/065; F16B 5/0657; B60R 13/0206
See application file for complete search history.

(56) References Cited

U.S. PATENT DOCUMENTS

| 4,422,222 A * | 12/1983 | Notoya ................. F16B 21/082 24/453 |
| 4,506,419 A * | 3/1985 | Mitomi ................. F16B 21/082 24/581.1 |
| 5,011,355 A * | 4/1991 | Motoshige ............ F16B 21/078 411/552 |
| 6,491,333 B2 * | 12/2002 | Ichikawa ................. B60J 3/023 296/97.9 |

(Continued)

FOREIGN PATENT DOCUMENTS

| EP | 0672559 A1 | 9/1995 |
| EP | 3812599 A1 | 4/2021 |

(Continued)

*Primary Examiner* — Matthew R McMahon
(74) *Attorney, Agent, or Firm* — Thompson Hine LLP (57) ABSTRACT

A fastener includes a head configured to be anchored to a part, and a locking member extending from the head to a distal end. The locking member has at least one protrusion spaced from the head, and a tool engaging head at the distal end. In use, the locking member extends through an opening of a panel such that the head is retained on a first side of the panel, the distal end is disposed on a second side of the panel, and the at least one protrusion abuts the second side of the panel to secure the panel to the fastener. The fastener includes a resiliently deformable portion arranged such that rotation of the tool engaging head deforms the resiliently deformable portion and moves the at least one protrusion out of abutment with the second side of the panel to release the panel from the fastener.

15 Claims, 8 Drawing Sheets

(56) References Cited

U.S. PATENT DOCUMENTS

| | | | | |
|---|---|---|---|---|
| 7,306,419 | B2* | 12/2007 | Lepper | F16B 21/086 |
| | | | | 411/453 |
| 7,328,489 | B2* | 2/2008 | Leverger | F16B 21/09 |
| | | | | 24/297 |
| 7,927,050 | B2* | 4/2011 | Koike | F16B 21/086 |
| | | | | 411/188 |
| 8,393,058 | B2* | 3/2013 | Okada | B60R 13/0206 |
| | | | | 24/297 |
| 9,856,899 | B2* | 1/2018 | Kuhm | F16B 21/086 |
| 9,938,997 | B2* | 4/2018 | Iwahara | F16B 5/0664 |
| 9,963,087 | B2* | 5/2018 | Leverger | F16B 13/045 |
| 10,124,744 | B2* | 11/2018 | Leverger | F16B 21/02 |
| 10,668,871 | B2* | 6/2020 | Yon | B60R 13/0206 |
| 10,746,218 | B2* | 8/2020 | Huet | F16B 21/086 |
| 10,752,182 | B2* | 8/2020 | Revilla | F16B 19/008 |
| 10,888,797 | B2* | 1/2021 | De Wilde | F16B 12/26 |
| 2006/0000064 | A1 | 1/2006 | Leverger | |
| 2017/0036618 | A1 | 2/2017 | Leverger | |
| 2018/0186305 | A1* | 7/2018 | Kanie | F16B 21/075 |

FOREIGN PATENT DOCUMENTS

| | | | | |
|---|---|---|---|---|
| GB | 2569316 A | 6/2019 | | |
| WO | WO-2021140027 A1 * | 7/2021 | | B60R 13/0206 |

* cited by examiner

FASTENER AND A PART HAVING THE SAME

This invention relates to a fastener for securing a part to a panel and a part having a fastener anchored thereto.

BACKGROUND

Fasteners for securing a part to a panel are known. However, prior art fasteners require access to the head of the fastener to secure or release the fastener, and thus the panel from the part. Furthermore, while prior art fasteners enable easy assembly of a part to a panel, they do not facilitate easy disassembly of the part from the panel. This is particularly problematic if the fastener is secured within a cavity of a part such as exterior trim of a vehicle and mounted to an interior panel of the vehicle door, as the head of the fastener will be contained within the assembled vehicle door and therefore be inaccessible to the user. The user is thus unable to remove the panel without significant risk of damaging the panel and/or the part in the process.

The present invention seeks to alleviate at least some of these issues.

BRIEF SUMMARY OF THE DISCLOSURE

Viewed from a first aspect, the present invention provides a fastener for securing a part to a panel, the fastener comprising a head configured to be anchored to the part, and a locking member extending from the head to a distal end. The locking member comprises at least one protrusion spaced from the head, and a tool engaging head at the distal end. In use, the locking member extends through an opening of the panel such that the head is retained on a first side of the panel, the distal end is disposed on a second side of the panel, and the at least one protrusion abuts the second side of the panel to secure the panel to the fastener. The fastener comprises a resiliently deformable portion arranged such that rotation of the tool engaging head deforms the resiliently deformable portion and moves the at least one protrusion out of abutment with the second side of the panel to release the panel from the fastener.

Thus, the present invention provides a fastener which can be accessed from the distal end of the fastener, where the panel is attached. This advantageously provides a way to release the panel from the fastener when access to the head of the fastener is restricted, such as when securing an external vehicle trim part to a vehicle door panel.

The locking member may comprise the resiliently deformable portion. The locking member may be joined to the head by a linkage. The linkage may comprise the resiliently deformable portion. The head may comprise the resiliently deformable portion. In various examples, each of the locking member, the linkage, and the head may have a resiliently deformable portion.

The at least one protrusion may have an inclined surface, and, when the locking member passes through the opening in the panel during use, the inclined surface is configured to engage an edge of the opening of the panel and move the at least one protrusion for securing the panel to the fastener. Such movement is caused be deforming the resiliently deformable portion. Hence, the fastener can be secured to the panel without using a tool.

The head may be received within a cavity of the part to anchor the fastener to the part. The head may comprise an anchor portion arranged to engage the cavity of the part to anchor the fastener to the part. The anchor portion may be configured, for example shaped, to prevent rotation of the anchor portion relative to the part.

The fastener may comprise one or more ridges formed on the head. The one or more ridges may be arranged to abut an inner surface of the cavity. The ridges may be arranged to increase anchorage of the head to the cavity, and to prevent rotation of the head relative to the part.

The tool engaging head may comprise a female part, for example a recess or a socket, for receiving the tool. Alternatively the tool engaging head may comprise a male part, for example a protrusion for engaging a spanner or socket tool. Suitable tool heads include a flat-headed screwdriver, a cross-headed screwdriver, a Torx-headed screwdriver, an allen key, a spanner, a socket wrench, or any similar such tool.

The head may comprise a second tool engaging head arranged such that, in use, the second tool engaging head is disposed on the first side of the panel, and rotation of the second tool engaging head is configured to move the at least one protrusion out of abutment with the second side of the panel to release the panel from the fastener. In this example, the fastener comprises first and second tool engaging heads arranged on opposite sides of the fastener, so that the fastener can be detached from the panel from either side of the panel.

The fastener may comprise a cage configured to partially surround the locking member. The cage preferably comprises an inclined surface for guiding the locking member through the slot of the panel.

The cage may comprise a side wall having an opening formed therein. The at least one protrusion may be arranged to extend at least partially through the opening to engage the second side of the panel in use. The opening may be arranged to limit movement of the at least one protrusion when the tool engaging head or the second tool engaging head is rotated.

The cage may comprise a distal end and the distal end of the locking member may be rotatably coupled to the distal end of the cage. This advantageously keeps the locking member aligned within the cage such that the locking member rotates about a central axis of the fastener.

The cage may comprise a resiliently biased member extending from the distal end of the cage towards the head. The locking member may be configured to engage the resiliently biased member such that the resiliently biased member resists rotation of the locking member. A deformable torsion spring is one example of a resiliently biased member.

In some examples, the distal end of the locking member comprises first and second resiliently biased segments, wherein the first and second segments are biased apart from one another. The distal end of the cage may comprise an opening for receiving the first and second segments, and, upon passing the first and second segments through the opening of the distal end of the cage, the first and second segments may be configured to deform towards the central axis of the fastener.

The fastener may comprise a nub formed on at least one of the first and second segments. The nub may be configured to engage a strut of the cage so as to secure the locking member to the cage. The nub may comprise an inclined surface configured to guide the distal end of the locking member through the opening of the distal end of the cage.

The fastener may comprise a seal configured to abut the first side of the panel.

In various examples the cage may comprise the seal, or the head may comprise the seal, or the locking member may comprise the seal, or the seal may be a separate component that is attachable to the cage or head or positionable between the head and the second side of the panel.

Viewed from a further independent aspect, the present invention provides a part comprising an opening and a fastener as described above anchored thereto.

The part may comprise a side trim for a vehicle door and the panel may comprise a part of the vehicle, in particular the vehicle door.

BRIEF DESCRIPTION OF THE DRAWINGS

Embodiments of the invention are further described hereinafter with reference to the accompanying drawings, in which.

DETAILED DESCRIPTION

Figure 1A:
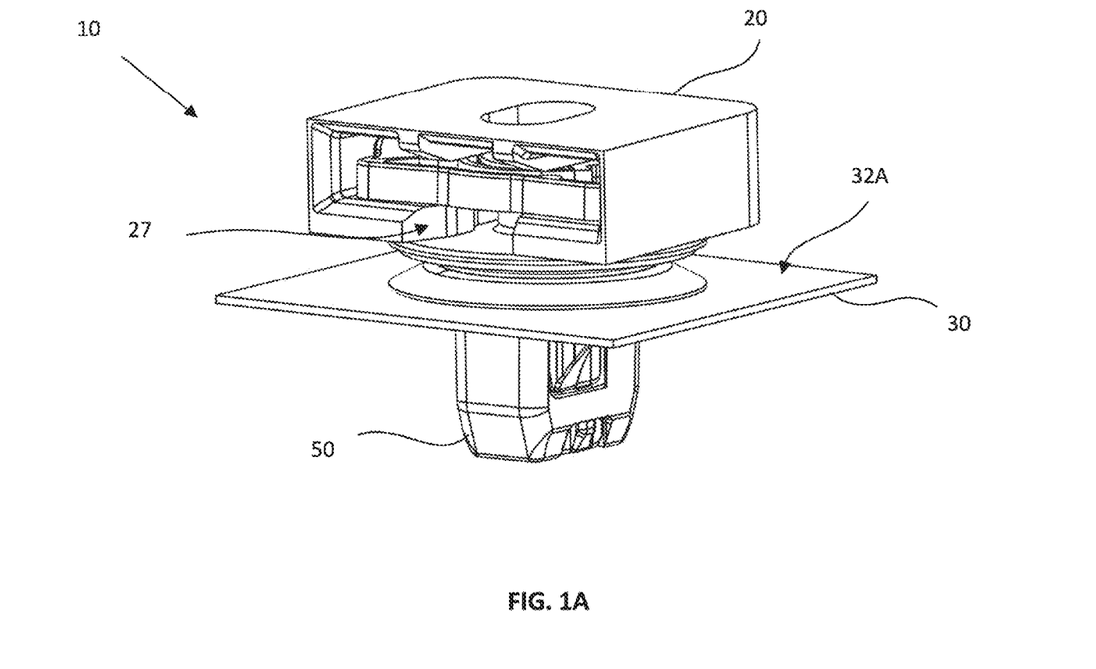
FIGS. 1A & 1B illustrate perspective views of an exemplary assembly.
Figure 1B:
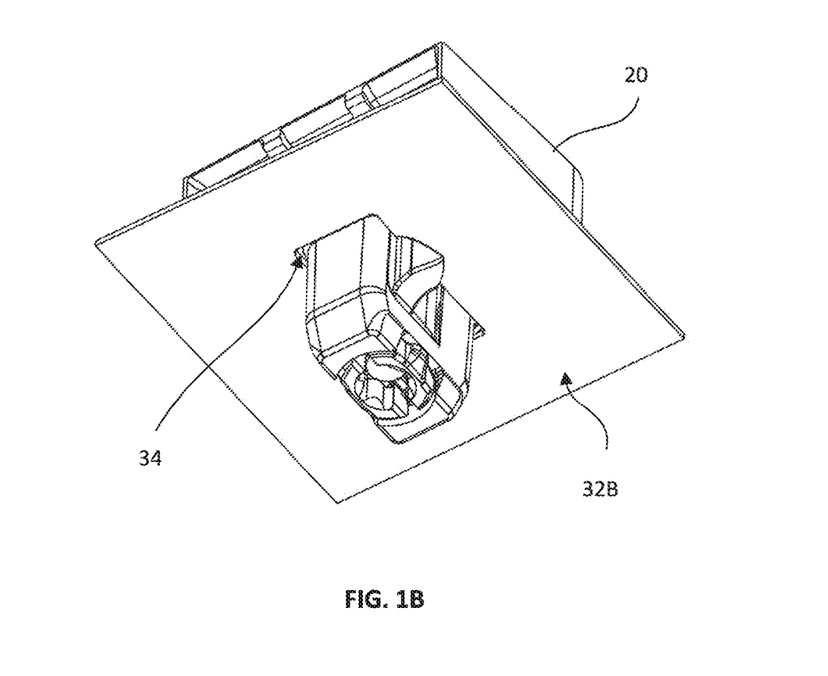

FIGS. 1A & 1B illustrate perspective views of an exemplary assembly 10. The assembly 10 shown in FIG. 1 includes a fastener 50 for securing a part 20 to a panel 30. The panel has a first side 32A on which the part 20 is disposed, a second side 32B, and an opening 34 through which a portion of the fastener 50 extends. The fastener 50 is slid into the part 20 via the opening in the part 20 and the slot 27 formed in the side wall of the part 20. In some examples, the part 20 is formed in a vehicle door protector.

Figure 2A:
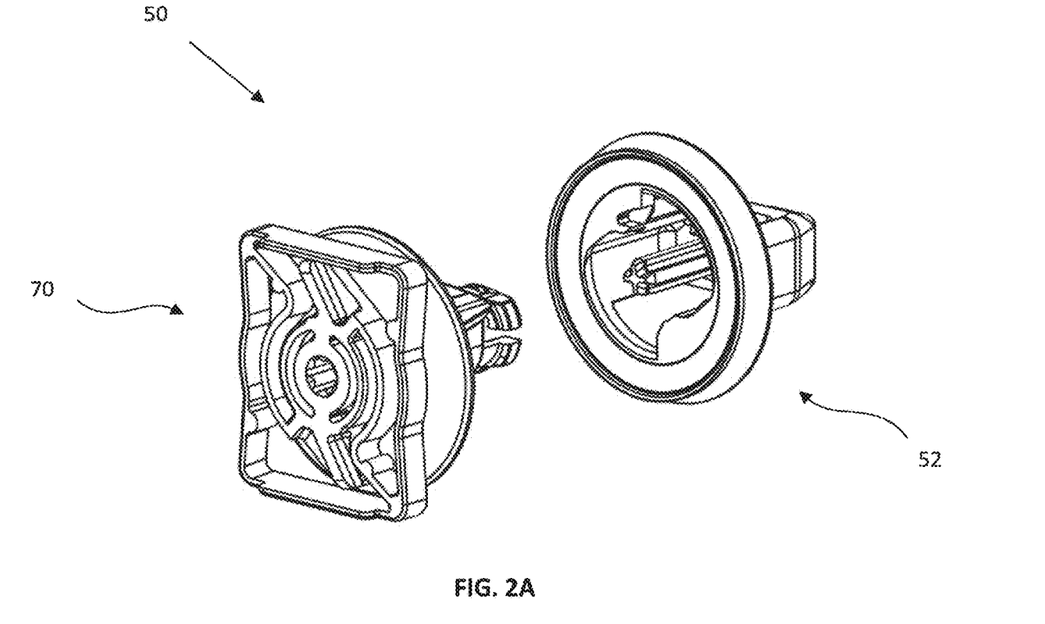
FIGS. 2A & 2B illustrate perspective exploded views of an exemplary fastener.
Figure 2B:
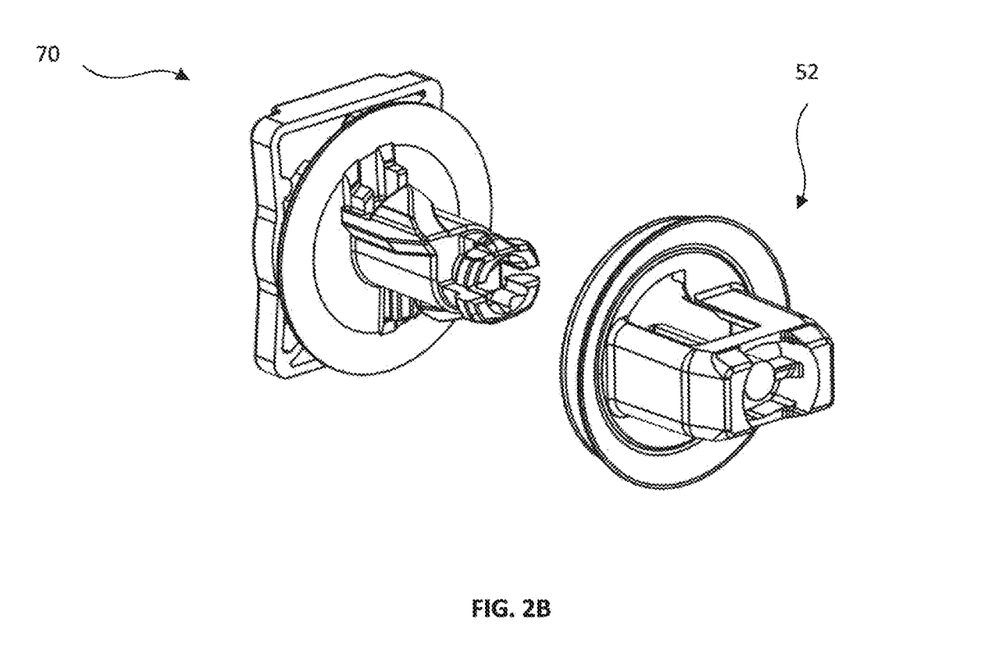

FIGS. 2A & 2B illustrate perspective exploded views of an exemplary fastener 50 including a locking member 70 and a cage 52 partially surrounding the locking member 70. The locking member 70 and cage 52 are secured to one another via mechanical means that will be described later. Whilst a fastener comprising a locking member 70 and a cage 52 are shown, both components are not essential for the fastener 50. In some cases, the fastener may only include the locking member 70.

Figure 3A:
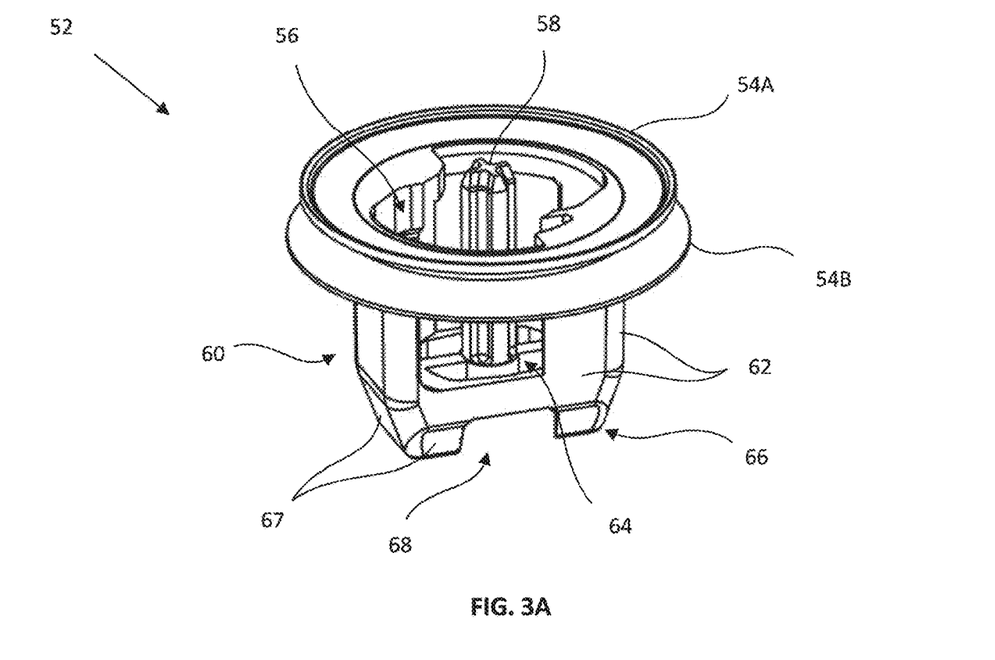
FIGS. 3A & 3B illustrate perspective and plan views of an exemplary cage.
Figure 3B:
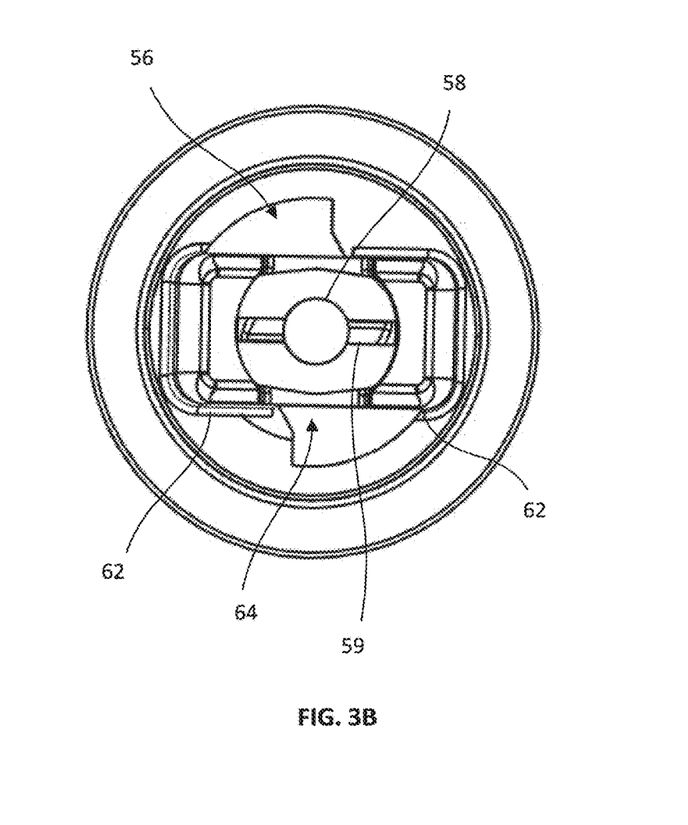

FIGS. 3A & 3B illustrate perspective and plan views of an exemplary cage 52. The cage 52 has a recess 56 at a proximal end for receiving a portion of the locking member 70 and a body 60 extending away from the proximal end to a distal end 66. The body includes side walls 62 which, when the cage 52 is secured to the locking member 70, partially surround the locking member 70. Two opposed side walls 62 of the body 60 have openings 64 through which the protrusions 78 (see FIG. 4) of the locking member 70 can extend. The openings 64 are also arranged to limit the movement of the protrusions 78 in a chosen direction, clockwise as shown in FIG. 3B, as the protrusions 78 will contact an edge of the opening 64 if rotated excessively a clockwise direction.

Figure 4A:
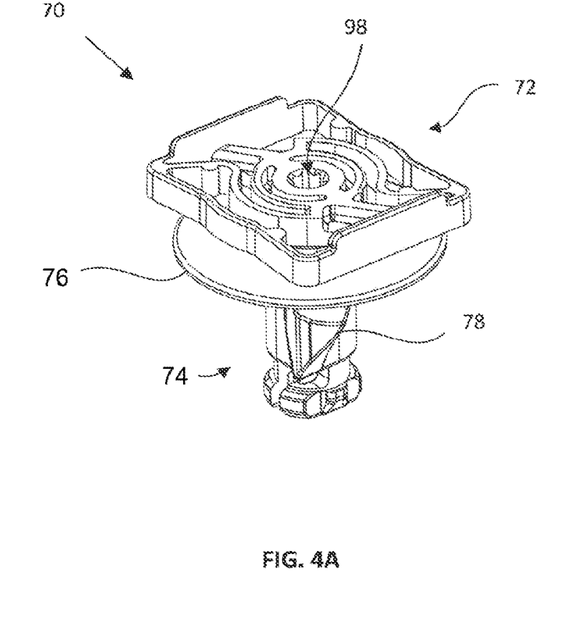
FIGS. 4A to 4C illustrate perspective and side views of an exemplary locking member.
Figure 4B:
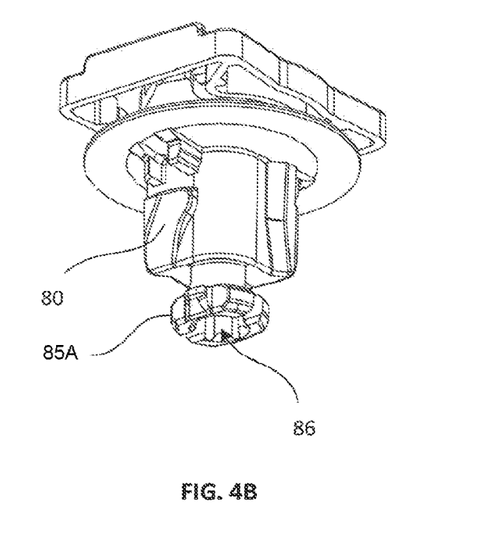
Figure 4C:
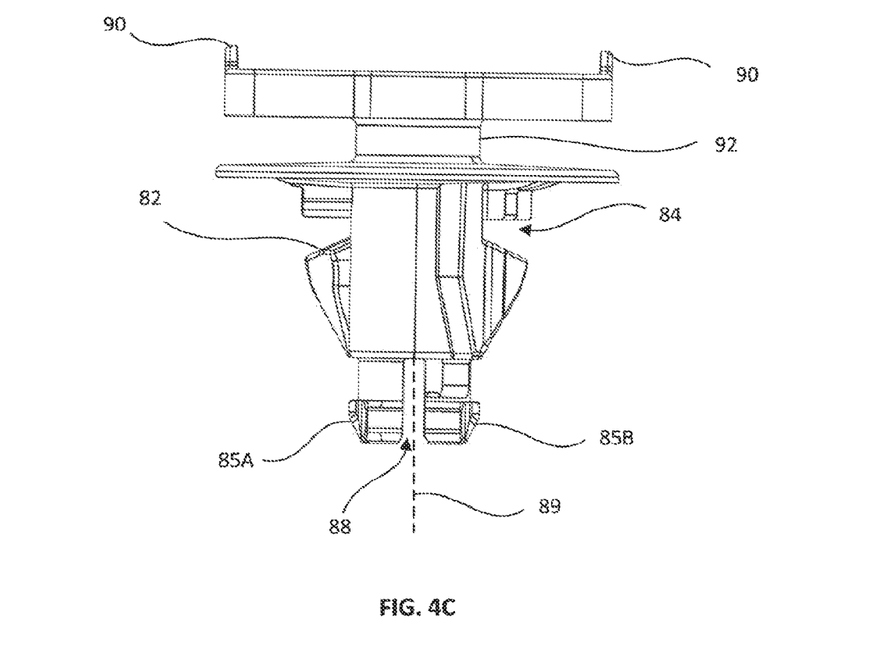

The distal end 66 of the cage 52 also includes inclined side walls 67 that help guide the fastener 50 into the opening 34 of the panel 30. The inclined side walls 67 are inclined towards a central axis 89 of the fastener 50. The cage 52 also includes a torsion spring 58 extending from the distal end 66 to the proximal end. The torsion spring 58 is formed on a strut 59 extending between the side walls 62 of the cage 52 and is configured to engage the locking member 70. As is illustrated in FIG. 4, the locking member 70 has a cavity 88 for receiving the torsion spring 58. The torsion spring 58 is biased to a locked position where the protrusions 78 are in contact with the panel 30, and therefore provides a restoring force on the protrusions 78 when the locking member 70 is rotated to release the panel 30 from the fastener 50. The cage 52 also includes first 54A and second 54B seals. The first seal 54A is arranged to contact a corresponding seal 76 on the locking member 70 and the second seal 54B is arranged to contact the first side 32A of the panel 30. Together, the seals 54A, 54B provide a sealed connection between the fastener 50 and the panel 30. Any of the seals 54A, 54B, 76 may comprise a thermoplastic elastomer.

FIGS. 4A to 4C illustrate perspective and side views of an exemplary locking member 70. The illustrated locking member 70 includes a head 72, a seal 76, a neck 92 between the head 72 and the seal 76, an elongate section 74 and two protrusions 78 formed on the elongate section 74. A recess 84 is provided between the seal 76 and the protrusions 78 for receiving the panel 30. The protrusions 78 have a first inclined surface 80 which facilitate insertion of the fastener 50 into the opening 34 of the panel 30 and a second inclined surface 82 arranged to abut the second side 32B of the panel 30 to secure the panel 30 to the fastener 50. The elongate section 74 extends from the head 72 to a distal end which has a cavity 88 for receiving the torsion spring 58. The distal end of the elongate section 74 is split into two segments 85A, 85B in order to allow the strut 59 of the cage 52 to pass through the distal end of the elongate portion 74.

As the cage 52 is mounted to the elongate portion 74, the distal segments 85A, 85B pass around the strut 59 of the cage 52 and partially surround the strut 59. As the cage 52 is pressed further onto the locking member 70, the distal segments 85A, 85B are pressed against the side walls 62 of the cage 52 and bend towards a central axis 89 of the fastener 50. As the distal segments 85A, 85B are resiliently biased, once the distal segments 85A, 85B have passed through the cage 52 and are disposed within the end opening 68 of the cage 52, the distal segments 85A, 85B will restore to their original position and define a tool engaging head 86 for receiving a suitable tool 100 (see FIG. 6) for operating the fastener 50. A nub 87 formed on each of the first 85A and second 85B distal segments is arranged to engage with a respective side wall 62 once the cage 52 is mounted to the locking member 70 (see FIG. 5B). Whilst the nubs 87 engage with the side wall 62 as a cantilever joint, it would be apparent this was not essential and other joints would be suitable for use with the present invention.

As shown in FIG. 4A, the locking member 70 includes a second tool engaging head 98 formed in the head 72. However, whilst it is advantageous to provide a tool engaging head 98 on the head 72, this is not essential to the present invention. In some cases, the second tool engaging head 98 may have the same profile as the first tool engaging head 86 or a different profile to the first tool engaging head 86.

Figure 5A:
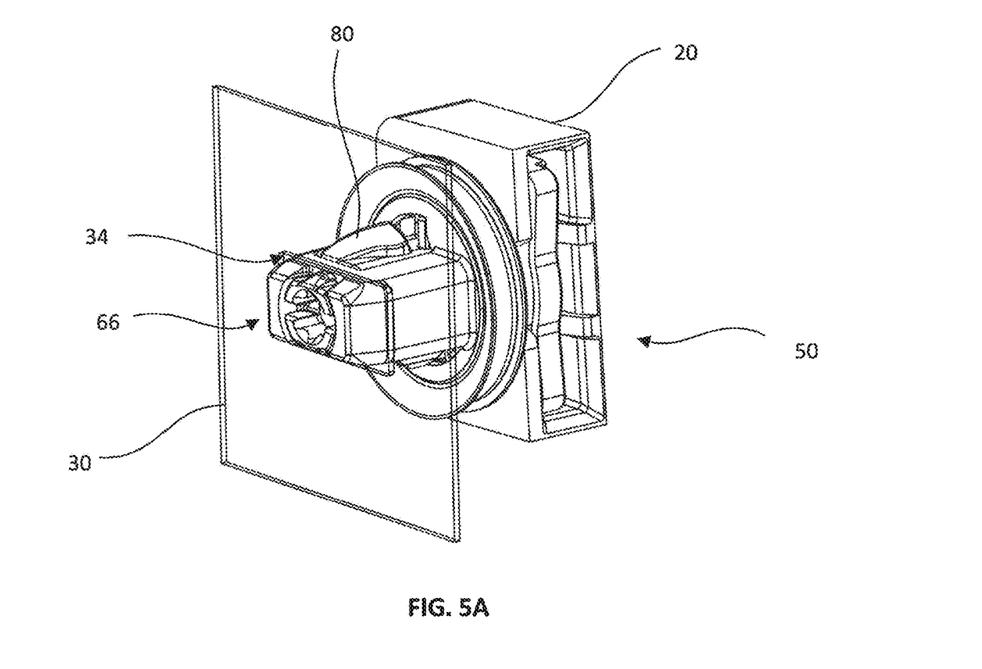
FIGS. 5A & 5B illustrate perspective views of an exemplary fastener having a panel attached thereto.
Figure 5B:
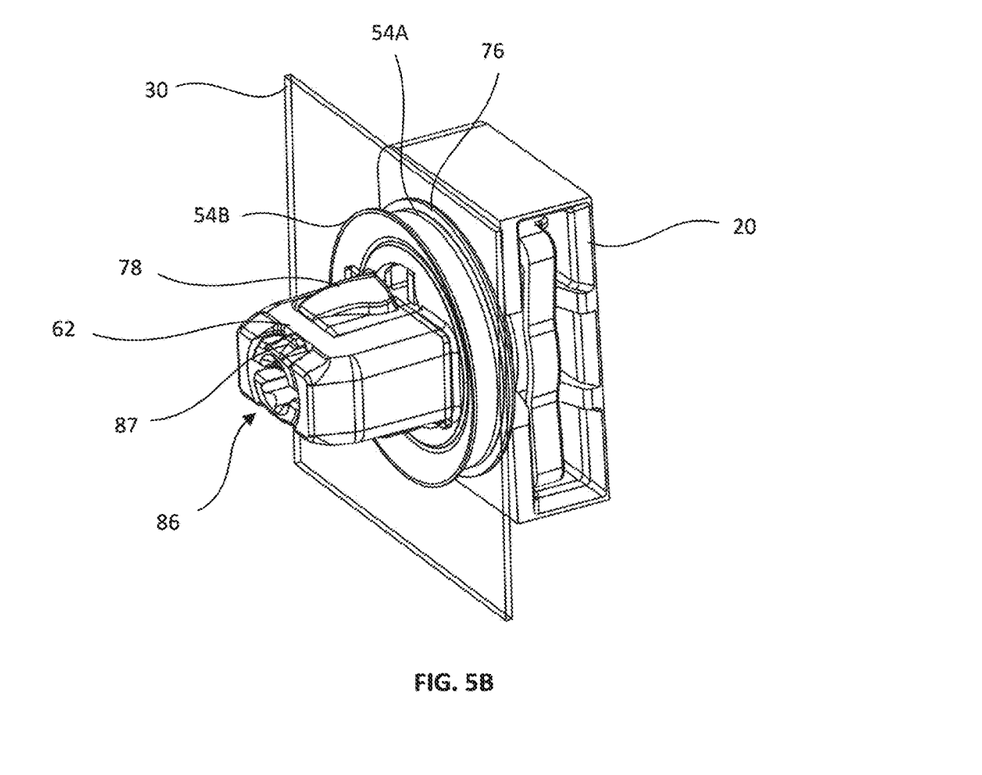

FIGS. 5A & 5B illustrate perspective views of an exemplary fastener 50 having a panel 30 attached thereto. The part 20 is brought to the panel 30 and the distal end of the fastener 50 is guided through the corresponding opening 34 in the panel 30 by the inclined surfaces on the distal end 66 of the cage 52. As the fastener 50 is pressed against the panel 30, an edge of the opening 34 will press against the inclined surface 80 and move the protrusions 78, allowing the fastener 50 to pass through the opening 34. Once the protrusions 78 have passed through the opening 34, as shown in FIG. 5B, the edge of the opening 34 will disengage from the inclined surface 80 and the torsion spring 58 will restore the protrusions 78 to the locked position, such that a second inclined surface 82 of the protrusions 78 abut the second side 32B of the panel 30 to secure the panel 30 to the fastener 50. While one fastener 50 is shown attached to the part 20, it would be apparent that a plurality of fasteners 50 may be used to secure the part 20 to a panel 30.

As shown in FIG. 5B, once the panel 30 is secured to the fastener 50, the second seal 54B abuts the first side 32A of the panel 30 and the inclined surface 82 of the protrusions 78 abut against the second side 32B of the panel 30. This prevents the panel 30 from being pulled off easily from the fastener 50. As illustrated, the head is disposed on the first side 32A of the panel 30 and the tool engaging head 86 is disposed on the opposite side of the panel. This allows an operator to release the fastener 50, and therefore part 20, from the panel 30 without needing to access the head of the fastener 50. This is particularly advantageous when the user is, for example, mounting external door trim to an interior door panel of a vehicle, as the head of the fastener will be inaccessible to the user once the trim is secured to the door panel. In this case, the user can access the tool engaging head 86 from the interior of the vehicle, as the distal end of the fastener 50 will remain accessible once the trim is mounted to the door panel.

Figure 6A:
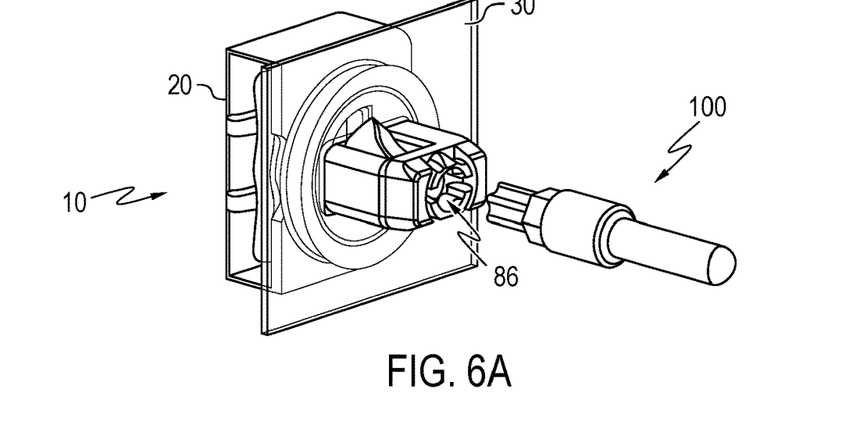
FIGS. 6A to 6C illustrate a method of releasing a panel.
Figure 6B:
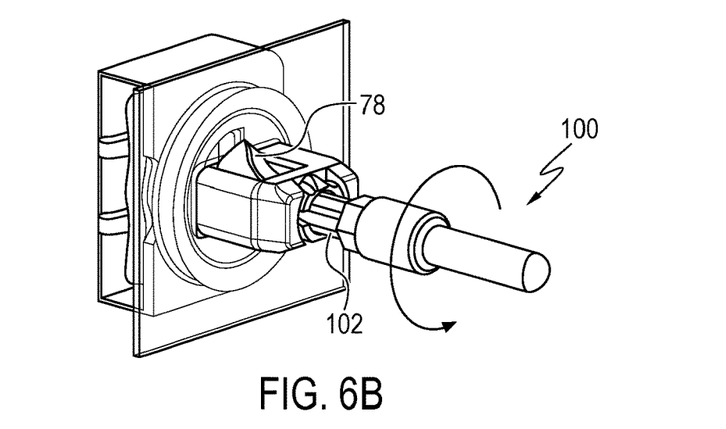
Figure 6C:
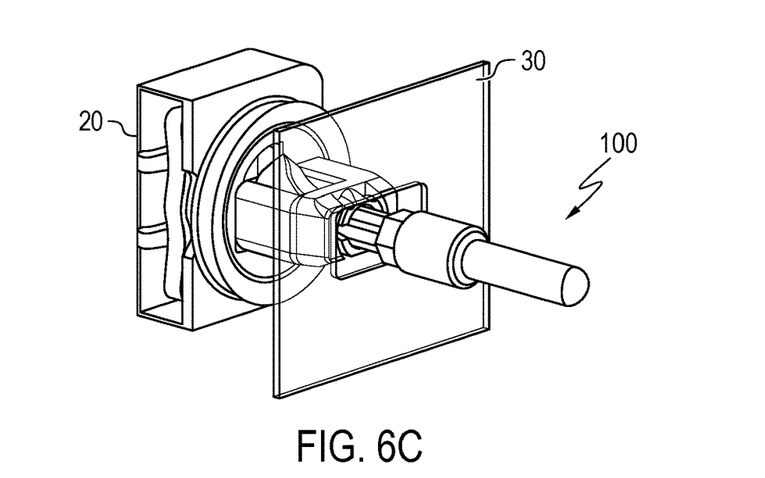

FIGS. 6A to 6C illustrate a method of releasing a panel 30. The assembly 10 shown in FIG. 6A includes a panel 30 mounted to the part 20 by a fastener 50 as described above. A tool 100 having a tool head 102 that corresponds to the tool engaging head 86 may be inserted into the tool engaging head 86 of the fastener 50 to release the panel 30. Once the tool head 102 is inserted into the tool engaging head 86, the tool can be operated to move the protrusions 78 within the cage 52 and allow the panel 30 to be separated from the fastener 50. One exemplary method of operating the tool is to rotate the tool 100 by approximately 40 degrees. While a Torx-headed tool is shown, it would be apparent this was not essential, and any tool profile that corresponds to the tool engaging head 86 would be suitable for use with the present invention.

Figure 7A:
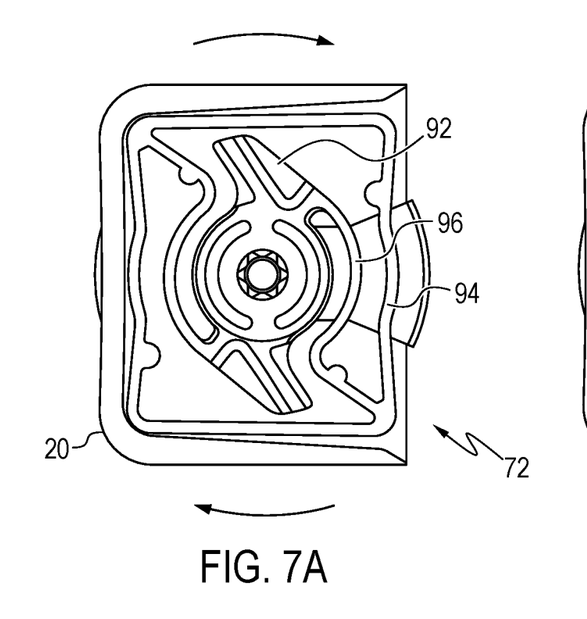
FIGS. 7A & 7B illustrate cross-sectional plan views of an exemplary head.
Figure 7B:
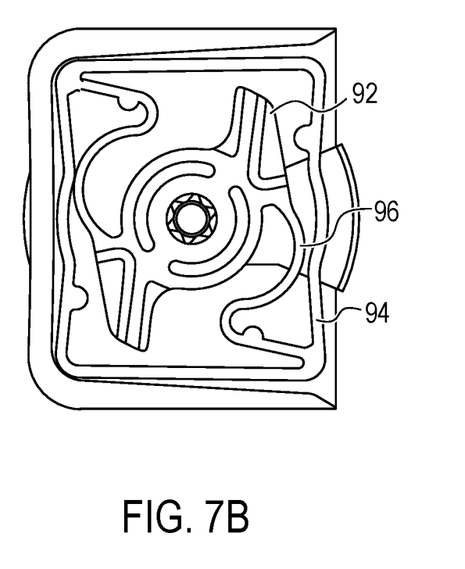
Figure 8A:
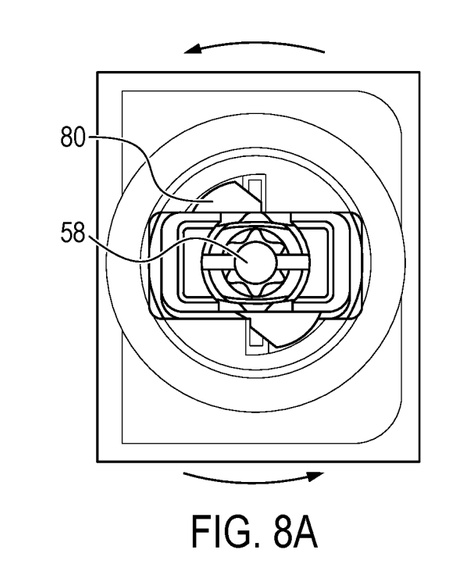
FIGS. 8A & 8B illustrate plan views of the locking member.
Figure 8B:
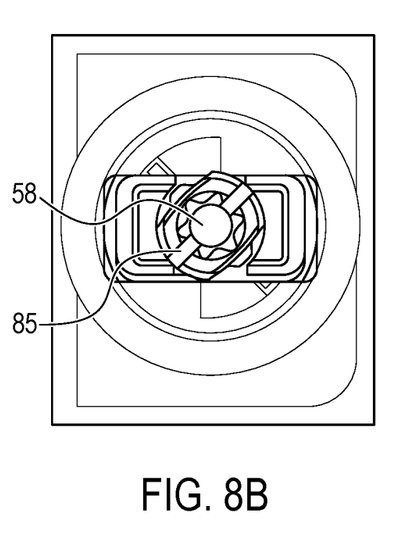

FIGS. 7A & 7B illustrate cross-sectional plan views of an exemplary head 72. The head includes an anchoring portion 92 secured to the neck 92 of the locking member 70, a wall 94 and a linkage 96 connecting the anchoring portion 92 to the wall 94. As the tool engaging head 86 rotates to the unlocked position (as shown in FIG. 7B and FIG. 8B), this causes the anchoring portion 92 to rotate by a similar amount. As the wall 94 and linkage 96 are resiliently deformable, rotation of the anchoring portion 92 deforms the linkage 96 and wall 94 within the cavity 24. Similarly, rotation of the tool engaging head 86 deforms the torsion spring 58 contained within the elongate portion 74. The deformation of the linkage 96, wall 94 and torsion spring 58 provide a resistive force to the rotation of the tool engaging head 86.

Figure 9:
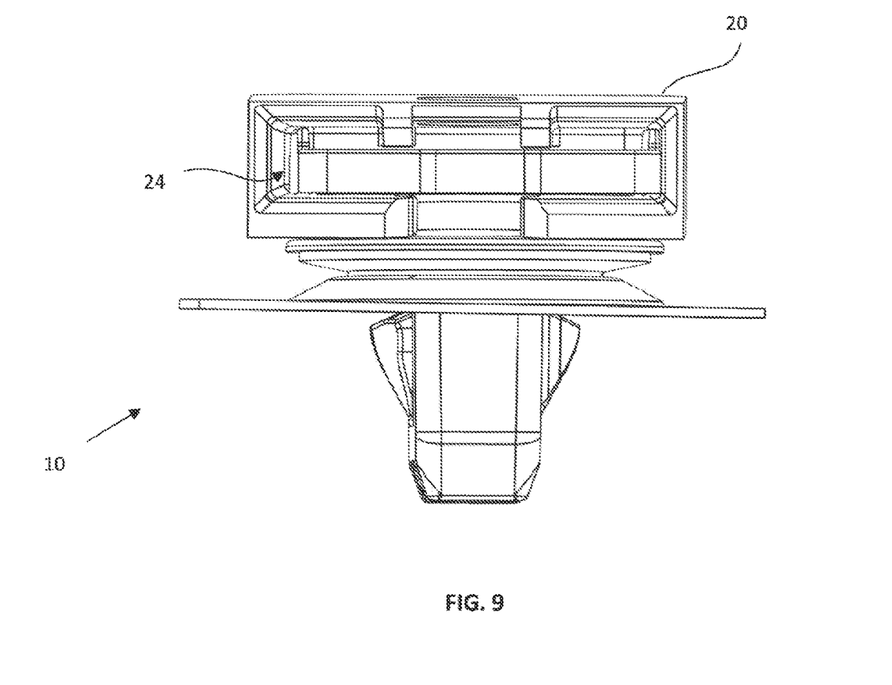
FIG. 9 illustrates a side view of the assembly.
Figure 10A:
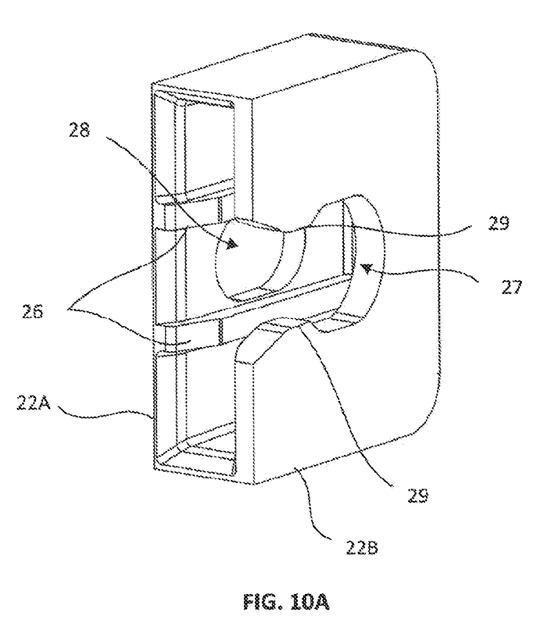
FIGS. 10A & 10B illustrate perspective and cross-sectional views of an exemplary cavity of a part.
Figure 10B:
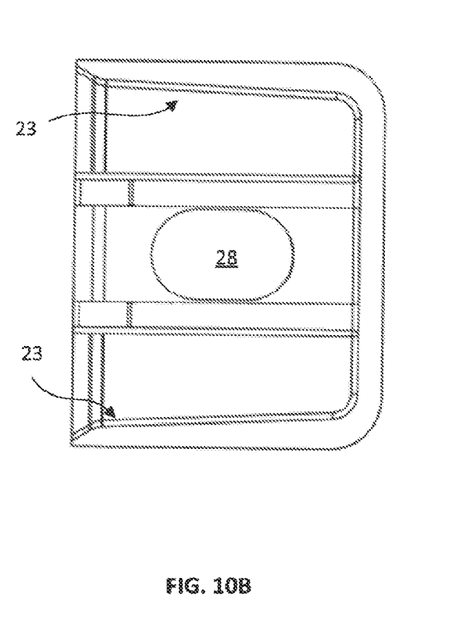

As shown in FIG. 9 the part 20 may have an opening to provide access to the cavity 24 for housing the head 72 of the fastener 50. As shown in FIG. 10, an internal surface of the cavity 24 may have a series of ribs 26 formed thereon arranged to abut against the head 72 when inserted into the cavity 24. As shown in FIG. 4C, the head 72 also includes a series of ridges formed thereon for abutting against the internal surface of the cavity 24. The combined effect of the ridges 90 and ribs 26 are that the head 72 is secured in the correct position within the cavity 24 and also that the head 72 remains substantially planar when deformed within the cavity 24. The side wall 22A having the ribs 26 formed thereon also includes an opening 28 for receiving a tool for engaging the second tool engaging head 98 of the fastener 50. The second opening 28 is not essential for the present invention.

A second side wall 22B of the part 20 also includes a slot 27 for receiving the neck 92 of the locking member 70. As shown, the slot 27 has a first section through which the neck 92 extends when the head 72 is anchored to the part 20, and a second section adjacent the first section through which the neck 92 can pass to release the fastener 50 from the part 20. The second side wall of the part 22B includes a pair of nubs 29 which defines a narrowed section of slot 27 compared to the first section which constrains the neck 92 to the first section of the slot 27. As the neck 92 slides through the narrowed section, side wall 22B deforms to allow the neck 92 to slide between the first and second sections of the slot 27. This advantageously allows the fasteners 50 to be re-used, as they can be easily removed from the part 20. The second section also includes a tapered section which facilitates the entry of the neck 92 into the slot 27. The tapered section widens towards the opening of the cavity 24. As shown in FIG. 10B, the cavity 24 has a tapered inner wall 23. The tapered inner wall 23 advantageously provides greater tolerance of manufacturing variability, as manufacturing variability will produce heads with slightly different dimensions. As it is important to maintain a tight fit between the head 72 and the part 20, it is necessary to account for such variability. Once the head 72 is slid into the cavity 24, the deformable wall 94 and linkage 96 may deform as needed to accommodate variations in head 72 size so that the head 72 can remain anchored to the part 20. The anchor portion 92 is also shaped to be relatively stiff compared to the wall 94 and linkage 96 such that deformation of the head 72 is substantially limited to the wall 94 and the linkage 96. Furthermore, the first section of the slot 27 may have an obround profile to allow for some movement of the head 72 within the cavity 24, e.g. 2 mm in the direction of the slot 27, to provide additional flexibility with regard to manufacturing variability.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A fastener for securing a part to a panel, the fastener comprising:
    a head configured to be anchored to the part, and
    a locking member extending from the head to a distal end, the locking member comprising:
        at least one protrusion spaced from the head, and
        a tool engaging head at the distal end,
    wherein, in use, the locking member extends through an opening of the panel such that the head is retained on a first side of the panel, the distal end is disposed on a second side of the panel, and the at least one protrusion abuts the second side of the panel to secure the panel to the fastener; and
    wherein the fastener comprises a resiliently deformable portion arranged such that rotation of the tool engaging head at the distal end deforms the resiliently deformable portion and moves the at least one protrusion out of abutment with the second side of the panel to release the panel from the fastener;
    wherein the resiliently deformable portion comprises a deformable head part that is directly connected to the head and located such that, in use, the deformable head part is located on the first side of the panel with the head and at least partly overlies regions of the panel such that at least a deforming portion of the deformable head part overlies the regions of the panel.

2. The fastener of claim 1, wherein the deformable head part comprises a linkage that joins the locking member to the head.

3. The fastener of claim 1, wherein the at least one protrusion has an inclined surface, and wherein, when the locking member passes through the opening in the panel during use the inclined surface is configured to engage an edge of the opening of the panel and move the at least one protrusion for securing the panel to the fastener.

4. The fastener of claim 1, wherein the head is received within a cavity of the part to anchor the fastener to the part.

5. The fastener of claim 4, where the head comprises an anchor portion arranged to engage the cavity of the part to anchor the fastener to the part, and wherein the anchor portion is configured to prevent rotation of the anchor portion relative to the part.

6. The fastener of claim 1, wherein the head comprises a second tool engaging head arranged such that, in use, the second tool engaging head is disposed on the first side of the panel, and wherein rotation of the second tool engaging head is configured to move the at least one protrusion out of abutment with the second side of the panel to release the panel from the fastener.

7. The fastener of claim 6 comprising a cage configured to partially surround the locking member.

8. The fastener of claim 7, wherein the cage comprises a side wall having an opening formed therein, wherein the at least one protrusion is arranged to extend at least partially through the opening to engage the second side of the panel in use, and wherein the opening is arranged to limit movement of the at least one protrusion when the tool engaging head or the second tool engaging head is rotated.

9. The fastener of claim 8, wherein the cage comprises a distal end and the distal end of the locking member is rotatably coupled to the distal end of the cage.

10. The fastener of claim 9, wherein the cage comprises a resiliently biased member extending from the distal end of the cage towards the head, wherein the locking member is configured to engage the resiliently biased member such that the resiliently biased member resists rotation of the locking member.

11. The fastener of claim 1 comprising a seal configured to abut the first side of the panel.

12. A part comprising an opening and the fastener of claim 1 anchored thereto.

13. The part of claim 12, further comprising the panel of claim 1, wherein the part comprises a side trim for a vehicle door and the panel comprises a part of the vehicle door.

14. The part of claim 12, wherein the part includes spaced apart first and second walls that define a cavity therebetween, the head positioned within the cavity such that the first wall is above the head and the second wall is below the head.

15. A fastener for securing a part to a panel, the fastener comprising:
    a head configured to be anchored to the part, and
    a locking member extending from the head to a distal end;
    a cage removably engaged with the locking member and configured to partially surround the locking member;
    the locking member comprising:
        at least one protrusion spaced from the head, and
        a tool engaging head at the distal end,
    wherein, when the cage is engaged with the locking member, the tool engaging head at the distal end of the locking member is exposed for tool access through an opening in a distal end of the cage;
    wherein, in use, the locking member extends through an opening of the panel such that the head is retained on a first side of the panel, the distal end of the locking member is disposed on a second side of the panel, and the at least one protrusion abuts the second side of the panel to secure the panel to the fastener;
    wherein the fastener comprises a resiliently deformable portion arranged such that rotation of the tool engaging head deforms the resiliently deformable portion and moves the at least one protrusion out of abutment with the second side of the panel to release the panel from the fastener; and
    wherein the resiliently deformable portion comprises a deformable head part that is directly connected to the head and located such that, in use, the deformable head part is located on the first side of the panel with the head and at least partly overlies regions of the panel such that at least a deforming portion of the deformable head part overlies the regions of the panel.

* * * * *